(12) United States Patent
Yamamoto

(10) Patent No.: US 7,330,932 B2
(45) Date of Patent: Feb. 12, 2008

(54) DISK ARRAY WITH SPARE LOGIC DRIVE CREATED FROM SPACE PHYSICAL DRIVES

(75) Inventor: Masanobu Yamamoto, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/598,124

(22) Filed: Nov. 13, 2006

(65) Prior Publication Data

US 2007/0061514 A1    Mar. 15, 2007

Related U.S. Application Data

(63) Continuation of application No. 10/769,895, filed on Feb. 3, 2004, now Pat. No. 7,136,964.

(30) Foreign Application Priority Data

Nov. 19, 2003    (JP)    ............................. 2003-389192

(51) Int. Cl.
*G06F 12/00* (2006.01)
*G06F 13/00* (2006.01)
*G11C 29/04* (2006.01)

(52) U.S. Cl. .......................... 711/114; 711/4; 711/161; 711/162; 711/171; 711/203; 711/209; 714/7; 714/710

(58) Field of Classification Search ...................... None
See application file for complete search history.

(56) References Cited

U.S. PATENT DOCUMENTS

| | | | |
|---|---|---|---|
| 4,914,656 A | 4/1990 | Dunphy, Jr. et al. ........ | 711/114 |
| 5,124,987 A | 6/1992 | Milligan et al. ............ | 711/114 |
| 5,491,816 A | 2/1996 | Matoba et al. .............. | 711/114 |
| 5,651,133 A | 7/1997 | Burkes et al. .............. | 711/114 |
| 5,657,439 A | 8/1997 | Jones et al. ................. | 711/114 |
| 5,974,544 A | 10/1999 | Jeffries et al. ............. | 711/114 |
| 6,067,574 A | 5/2000 | Tzeng | |
| 6,154,853 A | 11/2000 | Kedem ........................ | 711/114 |
| 6,237,061 B1 | 5/2001 | Srinivasan | |

(Continued)

FOREIGN PATENT DOCUMENTS

JP    2003-186630    7/2003

*Primary Examiner*—Hyung Sough
*Assistant Examiner*—Mardochee Chery
(74) *Attorney, Agent, or Firm*—Mattingly, Stanger, Malur & Brundidge, PC

(57) ABSTRACT

In a disk array system having a plurality of spare drives, the storage areas of which are not wasted without being influenced by the physical boundaries thereof. There is defined one large spare parity group 104 which is composed of a plurality of spare drives 103, 103, . . . , and so on. A spare logic drive 202 having the same capacity as that of a faulty data drive 101B is cut out from a large spare logic drive 201 provided by the spare parity group 104, and the data of the faulty data drive 101B are copied to the cut spare logic drive 202. A virtual physical drive 206 corresponding to the spare logic drive 202 is defined and is incorporated instead of the faulty data drive 101B into a data parity group 102A. As a result, data of the faulty data drive 101B are saved in the virtual physical drive 206 (or the spare logic drive 202).

6 Claims, 14 Drawing Sheets

U.S. PATENT DOCUMENTS

| | | |
|---|---|---|
| 6,754,773 B2 | 6/2004 | Ulrich et al. ............... 711/114 |
| 6,768,739 B1 | 7/2004 | Kobayashi |
| 2002/0156974 A1 | 10/2002 | Ulrich et al. ............... 711/114 |
| 2003/0046313 A1 | 3/2003 | Leung |
| 2003/0105921 A1 | 6/2003 | Lane ......................... 711/114 |

DISK ARRAY WITH SPARE LOGIC DRIVE CREATED FROM SPACE PHYSICAL DRIVES

CROSS REFERENCE TO RELATED APPLICATION

This is a continuation application of U.S. Ser. No. 10/769,895, filed Feb. 3, 2004, now U.S. Pat. No. 7,136,964 now allowed.

This application relates to and claims priority from Japanese Patent Application No. 2003-389192, filed on Nov. 19, 2003, the entire disclosure of which is incorporated herein by reference.

FIELD OF THE INVENTION

The present invention relates generally to a disk array system represented by a RAID device and, more particularly, to a system for saving the data of a data drive in the disk array system.

BACKGROUND OF THE INVENTION

In the disk array system, there is generally used a method, by which the data of a faulty data drive are saved in a spare drive packaged in advanced for an alternate. When the system is working in a sound state, the data of the data drive need not be saved in the spare drive so that the spare drive itself is not utilized in the least. The number of drives to be packaged in the disk array system is so limited that it cannot be made large at random.

JP-A-2003-186630 has provided a method for utilizing a small number of spare drive areas efficiently. In case a spare drive has a capacity larger than the individual ones of a plurality of data drives, according to that method, the spare drive is divided into a plurality of partitions, in which the data of the individual data drives are individually saved. Alternatively, in case a data drive has a larger capacity than the individual ones of a plurality of spare drives, the data drive is divided into a plurality of partitions, the data of which are individually saved in the individual spare drives.

A method described in Patent Publication 1 for saving the data in the spare drives can use the capacity of the spare drives to some efficient extent. So long as the individual capacities of all the data drives and all the spare drives are not equal, integral times or one integral number-th, however, a spare empty area may occur in the spare drives. In case the data of two data drives of 30 GB are already saved in a spare drive of 70 GB, for example, an empty area of 10 GB is left in that spare drive. In case the data of another data drive of 30 GB are then to be saved, the empty area of 10 GB is too small to use. Therefore, another spare drive is employed to leave the empty area of 10 GB useless.

The drives to be packaged in the disk array system have a variety of capacities so that the aforementioned problem occurs highly probably. In order to minimize the spare area, moreover, it is difficult in fact to decide what spare drive the saving area of a data drive is to be assigned and what area of the spare drive the same area is to be assigned.

Let the case be considered, in which a plurality of data drives of 30 GB, a plurality of data drives of 40 GB and two spare drives of 60 GB and 70 GB exist together, for example. When the data of a data drive of 30 GB are to be saved, whether it is optimum or not which of the spare drives of 60 GB and 70 GB is to be selected is different depending upon which of the data drives of 30 GB and 40 GB is to be saved in the future. Moreover, this decision is unknown at this stage, and it is seriously difficult to select the optimum assignment.

SUMMARY OF THE INVENTION

An object of the present invention is to provide a disk array system having a plurality of spare drives, in which the storage areas thereof cannot be wasted without being influenced by the physical boundaries thereof.

According to one aspect of the invention, there is provided a disk array system including a plurality of data physical drives and a plurality of spare physical drives, which comprises: a data parity group composed of the data physical drives; a spare parity group composed of the spare physical drives; spare logic drive retaining means for retaining a spare logic drive of a desired capacity in the spare parity group, in case a data physical drive to be data-saved exists in the data physical drives; and data saving means for saving the data of the data physical drive to be data-saved, in the spare logic drives.

In one mode of embodiment, the spare logic drive retaining means is configured to control the capacities of the spare logic drives to a size necessary for saving the data of the data physical drives to be data-saved, in accordance with the capacity of the data physical drives to be data-saved.

In one mode of embodiment, each time a data physical drive to be newly data-saved appears, the spare logic drive retaining means is configured to retain a new spare logic drive in advance in the parity group, and the data saving means is configured to save the data of the data physical drive to be newly data-saved, in the new spare logic drive.

In one mode of embodiment, the spare parity group is so configured of a data storing type having a redundancy that any of the spare physical drives in the spare parity group may be reproduced from the data of the remaining spare physical drives.

In one mode of embodiment, the data parity group is composed of a plurality of data drives. Moreover, the disk array system further comprises data parity group reconfiguring means for defining virtual physical drives corresponding to the spare logic drives and for removing the data physical drive to be data-saved, from the data parity group and incorporating the virtual physical drives instead into the data parity group.

In one mode of embodiment, the disk array system further comprises: drive kind deciding means for accepting a data accessing command for the data parity group, to decide whether each of the plurality of the data physical drives composing the data parity group is the virtual physical drive or an actual physical drive; physical drive control means for creating a data accessing command for the data physical drive which has been decided to be the actual physical drive by the drive kind deciding means; virtual drive control means for identifying the spare logic drive corresponding to the data physical drive which has been decided as the virtual physical drive by the drive kind deciding means, for identifying the spare parity group belonging to the spare logic drive identified, for identifying the spare physical drives composing the spare parity group identified, and for creating a data accessing command for the spare physical drive identified; and physical drive control means for accepting the data accessing command for the data physical drive, from the physical drive control means, to data-access the data physical drive, and for accepting the data accessing command for the data physical drive, from the virtual drive control means, to data-access the spare physical drive.

According to another aspect of the invention, there is provided a disk array system including a plurality of data logic drives and a plurality of spare physical drives, which comprises: a data parity group composed of the data physical drives; a spare parity group composed of the spare physical drives; spare logic drive retaining means for retaining a spare logic drive of a desired capacity in the spare parity group, in case a data logic drive to be data-saved exists in the plurality of data logic drives; and data saving means for saving the data of the data logic drive to be data-saved, in the spare logic drives.

According to still another aspect of the invention, a disk array system comprising a plurality of parity groups further comprises: spare logic drive retaining means for retaining a spare logic drive of a desired capacity in another parity group, in case a physical or logic drive to be data-saved exists in any of the parity groups among the plurality of parity groups; and data saving means for saving the data of the physical or logic drive to be data-saved, in the spare logic drives.

According to a further aspect of the invention, there is provided a method in a disk array system having a plurality of data physical drives and a plurality of spare physical drives, for saving the data of the data physical drives in the spare physical drives. The method comprises: the step of composing a spare parity group with the plurality of the spare physical drives; the step of retaining a spare logic drive of a desired capacity in the spare parity group, in case a data physical drive to be data-saved exists in the plurality of data physical drives; and the step of saving the data of the data physical drive to be data-saved, in the spare logic drives.

DESCRIPTION OF THE PREFERRED EMBODIMENT

One embodiment of the invention will be described with reference to the accompanying drawings.

Figure 1:
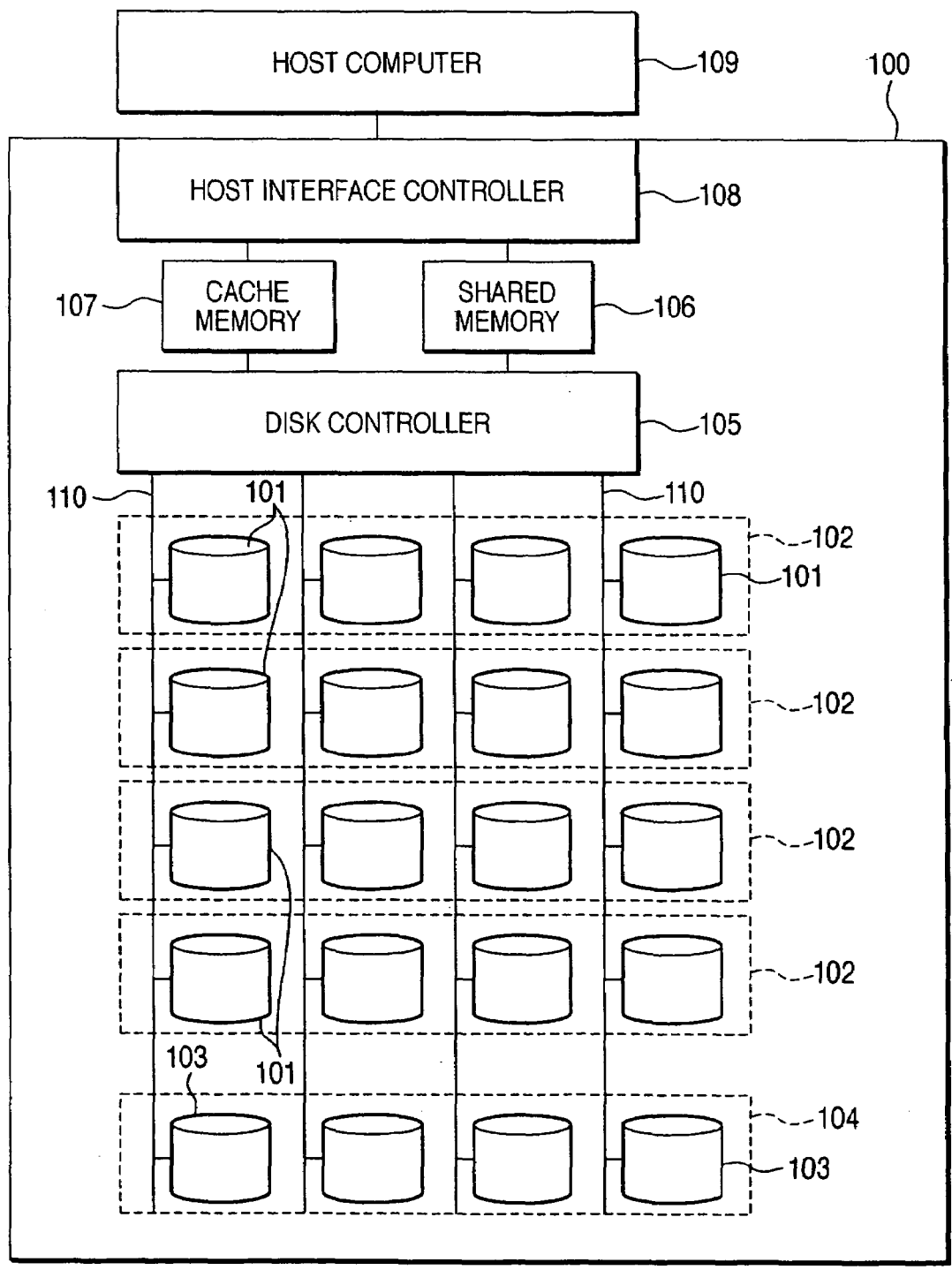
FIG. 1 is a block diagram showing the entire configuration of a disk array system according to one embodiment of the invention.

FIG. 1 shows the entire configuration of a disk array system according to the embodiment of the invention.

As shown in FIG. 1, a disk array system 100 includes a number of disk drives 101 and 103, a disk controller 105, a shared memory 106, a cache memory 107 and a host interface controller 108. The disk drives 101 and 103 can be classified according to their using purposes into the data drives 101 to be used as the main storage areas of the data, and the spare drives 103 to be used as the targets of the saved data of the data drives 101 so that they may be prepared for the faults of the data drives 101. The manner to decide what disk drive is to be specifically used as the data drive 101 or the spare drive 103 can be arbitrarily controlled by an instruction issued from the user, a host computer 109 or the like to the disk array system 100.

The disk controller 105 mainly controls data reading/writing of the disk drives 101 and 103. The host interface controller 108 is connected with one or more host computers (as will be shortly referred to hosts), and transmits and receives the commands demanding the host computer 109 for reading/writing the data, the responses to those command, and the data or the like to be read/written. Moreover, the host interface controller 108 interprets the commands of the data read/write commands or the like received from the host computer 109, and controls the actions of the individual portion in the disk array system 100 such as the disk controller 105 in accordance with the interpretation result. The disk controller 105 and the host interface controller 108 cooperate to control the actions to save the data of the data drives 101 in the spare drives 103 and to process the demands from the host 109 for reading/writing the data saved.

The shared memory 106 is stores with a variety of managing and controlling data and a variety of control programs. These data and programs in the shared memory 106 are registered, updated, referred to or executed by the disk controller 105 and the host interface controller 108 so that the disk controller 105 and the host interface controller 108 can performed their actions correctly.

The cache memory 107 is used to hold the data read from the disk drives 101 and 103 by the disk controller 105 and the data received from the host computer 109 by the host interface controller 108, for a while till at least those data are sent to their individual destinations. In case the data read demand is received from the host 109, for example, the data read from the proper data drive 101 are once stored in the cache memory 107 and are then transferred to the host 109 through the host interface controller 108. In case the data write demand is accepted from the host 109, on the other hand, the data to be written are once stored in the cache memory 107 and are then written in the proper data drives 101 through the disk controller 105.

The disk controller 105 has a plurality of disk connecting interfaces 110, each of which is connected with a plurality of data drives 101 and one or more spare drives 103. Each data drive 101 is logically coupled to one or more other data drives 101 connected with different disk connecting interfaces 110, to form a parity group 102. Each spare drive 103 is also logically coupled to one or more other spare drives 103 connected with different disk connecting interfaces 110, to form a parity group 104. In the following description, the parity group 102 configured of the data drives 101 and the parity group 104 configured of the spare drives 103 will be called the data parity group and the spare parity group, respectively, so that they may be identified from each other. Usually, a plurality data parity groups 102 exist, and one or more spare parity groups 104 exist. The shared memory 106 is stored with the information (as will be called the parity group information) defining which disk drive 101 or 103 configures the parity groups 102 and 104 and which kind of the data parity group or the spare parity group the parity group 102 or 104 belongs to. When the disk controller 105 reads and writes the data from and in the disk drives 101 and 103, the disk controller 105 judges which of the data drives 101 and 103 is to be read/written, with reference to the aforementioned parity group information. When the disk controller 105 saves the data of the data drives 101, moreover, the disk controller 105 judges what spare drive 103 is to be written with the data to be saved, with reference to the aforementioned parity group information.

Figure 2:
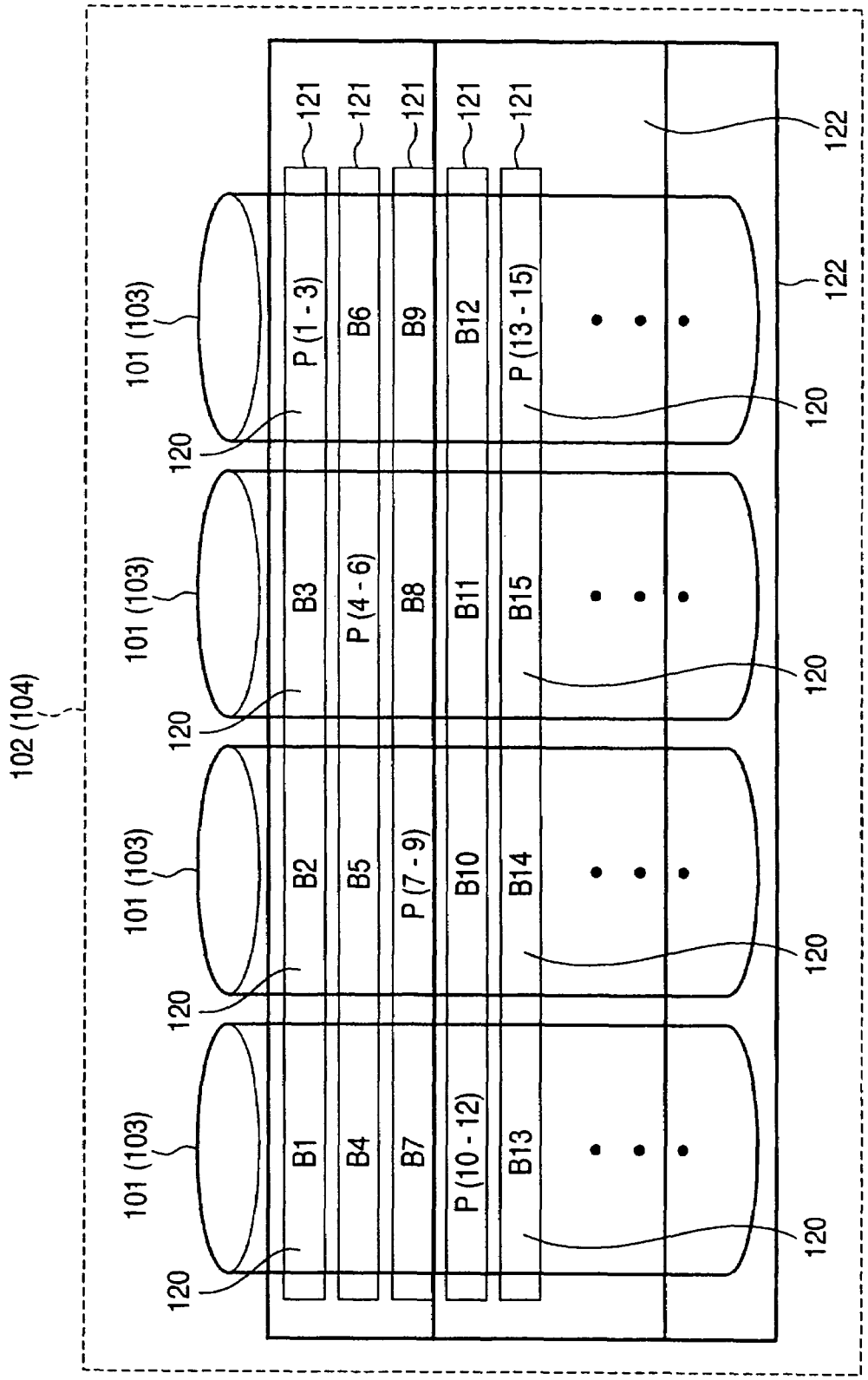
FIG. 2 is a block diagram explaining a data storage configuration in a parity group.

FIG. 2 is a block diagram explaining the data storage configuration in the parity group. In FIG. 2, as one example, there is taken up the parity group of the "3D+1P" configuration (in which three data are individually stored in three disk drives and in which the parity data obtained from the logical OR of those three data are stored in another disk drive), which is composed of four disk drives. However, the following description referred to FIG. 2 is also applied to parity groups of various configurations according to the principle of RAID1 or RAID5. This description is further applied not only to the data parity group 102 but also to the spare parity group 104, as shown in FIG. 1.

As shown in FIG. 2, the storage area of each of a plurality of data drives 101, 101, . . . , and so on (or 103, 103, . . . , and so on) composing one parity group 102 (or 104) is logically divided into a multiplicity of small storage areas (as will be called block areas) having a predetermined unit capacity. Moreover, each of the block areas 120, 120, . . . , and so on in each disk drive 101 (or 103) is logically combined with the block areas 120, 120, . . . , and so on in all the remaining data drives 101, 101, . . . , and so on (or 103, 103, . . . , and so on) to form areas (as will be called stripe areas) 121, 121, . . . , and so on, which are shown as transversely extended rows in FIG. 2. Thus, a multiplicity of stripe areas 121, 121, . . . , and so on exist in one parity group 102 (or 104).

Each stripe area 121 crosses all the data drives 101, 101, . . . , and so on (or 103, 103, . . . , and so on) composing its parity group 102 (or 104), as shown, and is composed of a plurality of block areas 120, 120, . . . , and so on, which are individually selected from all of those disk drives 101, 101, . . . , and so on (or 103, 103, . . . , and so on) Of a plurality of block areas 120, 120, . . . , and so on composing one stripe area 121, for example, the block areas 120, 120, . . . , and so on excepting one thereof are stored with object data to be accessed to by the host 5, and the excepted block area 120 is stored with the parity data created from the object data. In the stripe area 121 shown at the uppermost position in FIG. 2, for example, reference characters B1, B2 and B3 designate the object data, and reference characters P(1-3) designate the parity data created from the object data B1, B2 and B3. Thus, each stripe area 121 having the redundant data structure containing the parity data has a relation in which any data contained can be reproduced from all the remaining data. In a parity group 102 (or 104), therefore, each data drive 101 (or 103) can be reproduced from the data of all the remaining disk drives 101, 101, . . . , and so on (or 103, 103, . . . , and so on).

Each parity group 102 (or 104) provides, in its entirety, one logical disk drive of a large capacity, i.e., one storage area, which is released from the physical boundaries of a plurality of data drives 101, 101, . . . , and so on (103, 103, . . . and so on) and which is logically continuous with a large capacity. Moreover, this large-capacity logic drive can be divided into a plurality of logic drives 122, 122, . . . , and so on of a smaller capacity. Each of these divided logic drives 122, 122, . . . and so on is composed of a set of an arbitrary number of stripe areas. In other words, the individual capacities of the divided logic drives 122, 122, . . . , and so on can be set substantially freely without being influenced by the physical boundaries of a plurality of data drives 101, 101, . . . ,and so on (103, 103, . . . , and so on) composing the parity group. This advantage is utilized for controlling the data save in this embodiment, as will be described hereinafter.

Figure 3:
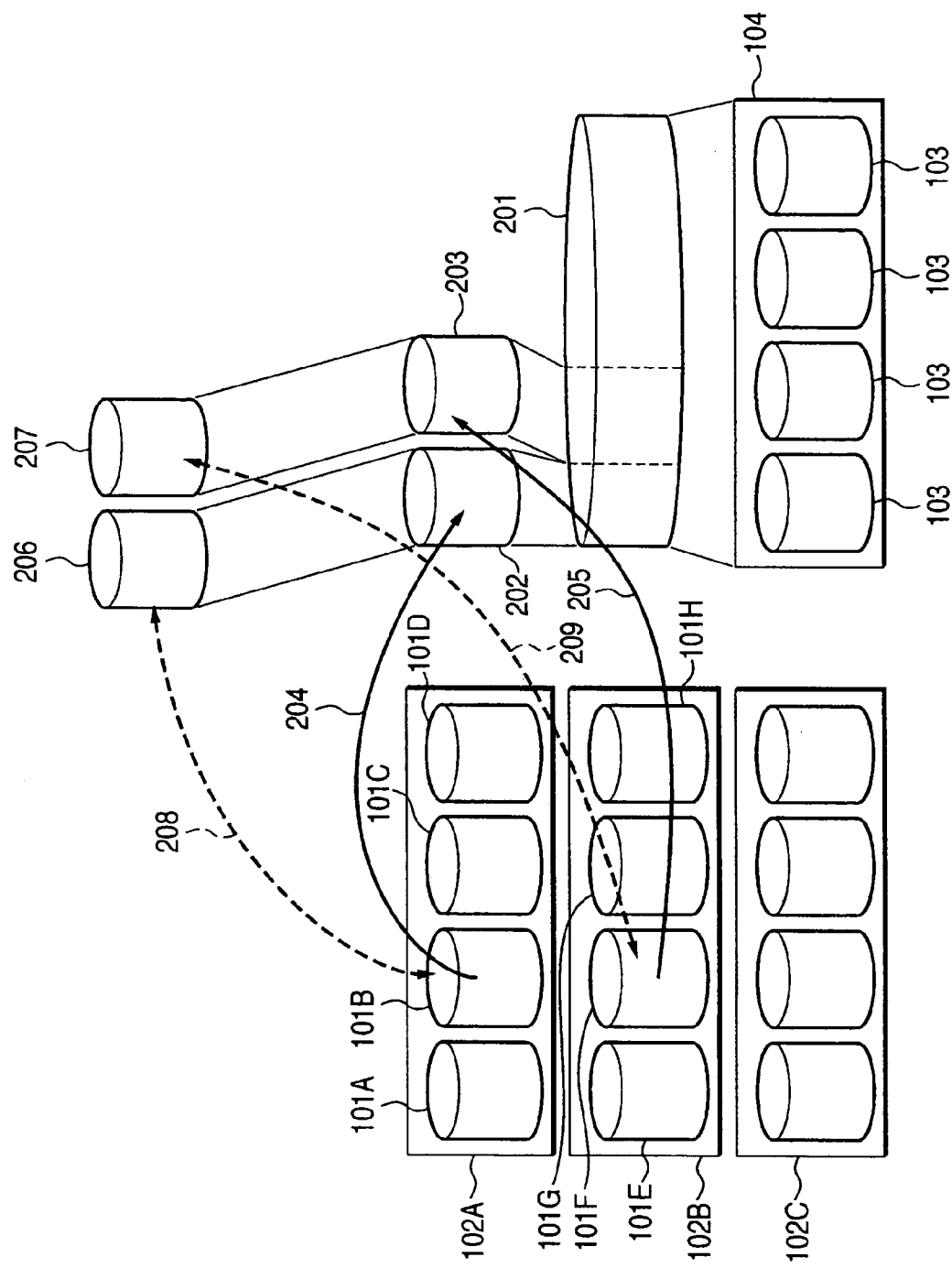
FIG. 3 is a block diagram showing a summary of a data saving action in the embodiment.

FIG. 3 shows a summary of the data saving action in this embodiment.

One large spare parity group 104 composed of a plurality of spare drives 103, 103, . . . , and so on is defined, as shown in FIG. 3. This spare parity group 104 provides one data saving logic drive 201 (as will be called a large spare logic drive) of a large capacity, as has been described hereinbefore.

When a data drive 101B fails, for example, so that the data of the data drive (as will be called the faulty data drive) 101B have to be saved, a data saving area (as will be called a spare logic drive space) 202 having the same net capacity (i.e., the storage capacity exclusively for the object data excepting the parity data) as that of the faulty data drive 101B is retained from the leading address of the large spare logic drive 201 provided by the spare parity group 104, and is assigned to the faulty data drive 101B. The spare logic drive space 202 thus assigned to the faulty data drive 101B is defined as one logical spare drive (as will be called an assigned spare logic drive). After this, the data in the faulty data drive 101B are copied, as indicated by arrow 204, to the assigned spare logic drive (or the logic spare drive space) 202. Moreover, a virtual physical drive (as will be called a virtual drive) 206 is defined for the assigned logic drive 202. The faulty data drive 101B is removed from a data parity group 102A, and the virtual drive 206 is incorporated instead, as indicated by an arrow 208, into the data parity group 102A. As a result, the data of the faulty data drive 101B are saved in the virtual drive 206 (or the assigned spare logic drive 202).

After this, when the data of another faulty data drive 101F have to be saved, a new spare logic drive space 203 having the same net capacity as that of the faulty data drive 101F is retained from the address succeeding to the assigned spare logic drive 202 already defined in the large spare logic drive 201 (that is, so that the address may continue without any spare area from the preceding assigned spare logic drive 202), and is defined as a new assigned spare logic drive assigned to the faulty data drive 101F. The data of the faulty data drive 101F are copied, as indicated by an arrow 205, to the assigned spare logic drive 203. Moreover, A virtual drive 207 is defined for the assigned spare logic drive 203. The faulty data drive 101F is removed from a data parity group 102B, and the virtual drive 207 is incorporated instead, as indicated by an arrow 209, into the data parity group 102B.

As a result, the data of the faulty data drive 101F are saved in the virtual drive 207 (or the assigned spare logic drive 203).

The actions thus far described can be repeated from the large spare logic drive 201 of the spare parity group 104 till a free storage area necessary for the next spare logic drive disappears. Those actions can also be repeated till the free storage area entirely disappears from the large spare logic drive 201, if the method of dividing the drive to be saved into partitions, as described in JP-A-2003-186630, is used together. So long as the large spare logic drive 201 has a necessary free space, the number of data drives to be saved into the logic drive is not limited in the least. Therefore, it may be possible to save more data drives than the spare drives.

Moreover, the data can be pushed by a prepacking into the large spare logic drive 201 each time the data drive of a data saving object occurs, without being conscious of: which of the data drive and the spare drive has a larger capacity; the capacity of the data drive of the next data saving object in the future; or the physical boundary between the spare drives. Therefore, it is possible to make effective use of the space of the spare drive.

Figure 4:
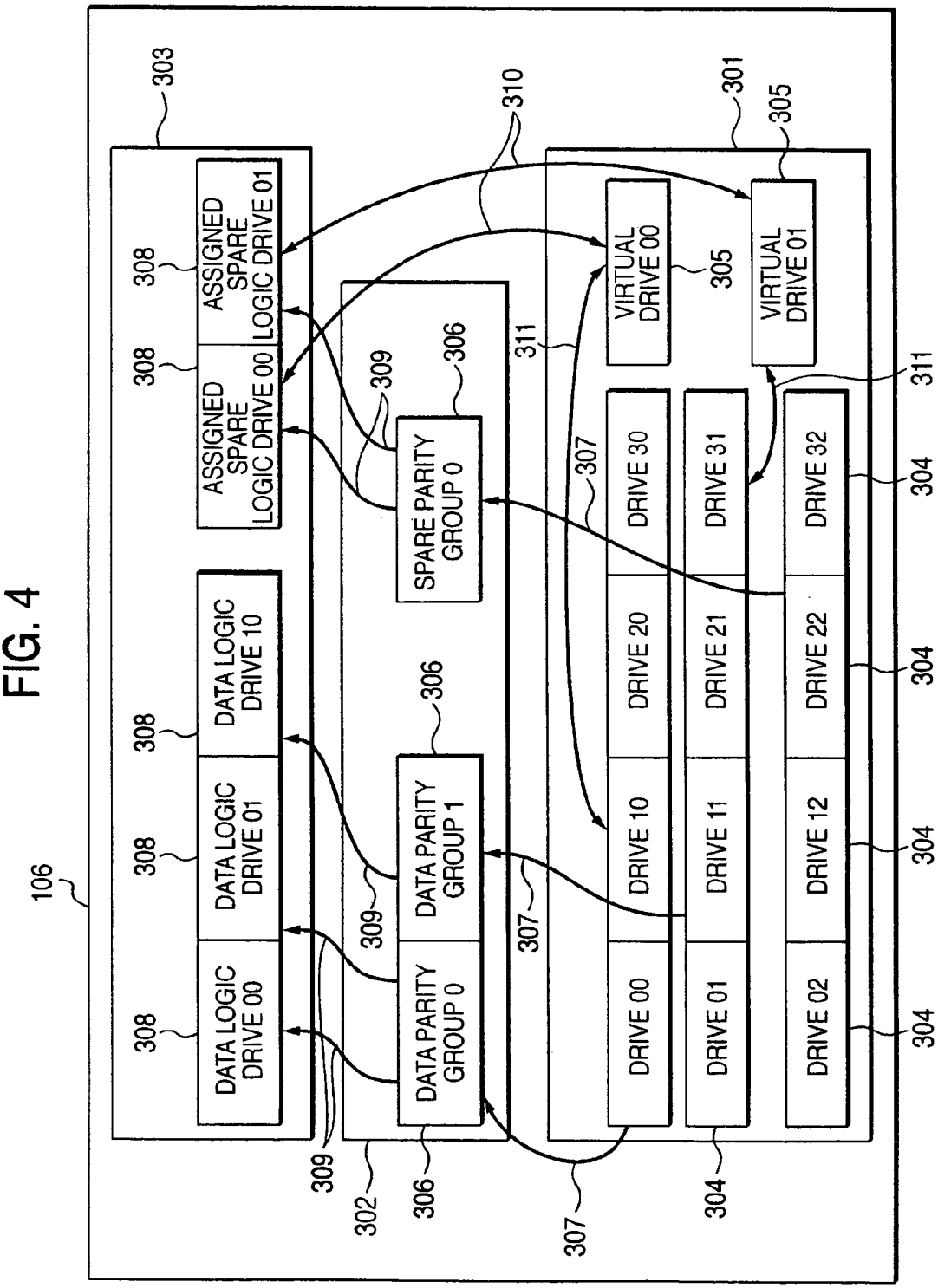
FIG. 4 is a block diagram showing an example of management data stored in a shared memory 106 and utilized for controlling the data save.

FIG. 4 shows an example of management data stored in the shared memory 106 and utilized for controlling the data save.

In the shared memory 106, there are stored physical drive information 301, parity group information 302 and logic drive information 303. For all the individual disk drives such as the data drives 101, 101, . . . , and so on and the spare drives 103, 103, . . . , and so on shown in FIG. 1, there are stored, as the physical drive information 301, pieces of physical drive defining information 304, 304, . . . , and so on which include physical drive identifying information inherent in the disk drive, location information indicating the packaging place in the disk array system 100, capacity information indicating the storage capacity, type information indicating the type and kind information indicating whether the disk drive is the data drive or the spare drive. Not only for the existing physical drives 101, 101, . . . , and so on and 103, 103, . . . , and so on but also for the virtual drives individually corresponding to the assigned spare logic drives having been described with reference to FIG. 3, there are also stored in the disk information 301 pieces of virtual drive defining information 305, 305, . . . , and so on which include the virtual drive identifying information inhered in the virtual drive, the location information, the capacity information, the type information, the kind information indicating the virtual drive, and the logic drive identifying information for identifying the corresponding logic drive (or the assigned spare logic drive).

For all the individual parity groups such as the data parity groups 102, 102, . . . , and soon and the spare parity groups 104, 104, . . . , and so on, there are stored in the parity group information 302 pieces of parity group defining information 306, 306, . . . , and soon which include the parity group identifying information inherent in the parity group, the physical drive identifying information of a plurality of disk drives composing the parity group, and the kind information indicating whether the parity group is the data parity group or the spare parity group. The pieces of parity group identifying information 306, 306, . . . , and so on are individually linked, as indicated by an arrows 307, to the pieces of physical drive identifying information 304, 304, . . . , and so on of a plurality of disk drives composing the parity group.

For all the logic drives, there are stored in the logic drive information 303 pieces of logic drive identifying information 308, 308, . . . , and so on which include the logic drive identifying information inherent in the logic drive, the parity group identifying information of the parity group where the logic drive exists, the location information (e.g., the identification number of the block area or the stripe area) in the parity group. These pieces of logic drive identifying information 308, 308, . . . , and so on are individually linked, as indicated by arrows 309, to the pieces of drive information 306, 306, . . . , and soon composing the corresponding parity group. The logic drive defined herein includes not only the data logic drive provided from the data parity group but also the assigned spare logic drive provided from the spare parity group. The pieces of logic drive identifying information 308, 308, . . . , and so on of the assigned spare logic drive are individually linked, as indicated by arrows 310, 310, . . . , and so on, to the pieces of virtual drive identifying information 305, 305, . . . , and so on of the corresponding virtual drive. Moreover, the pieces of virtual drive identifying information 305, 305, . . . , and so on are individually linked, as indicated by arrows 311, to the pieces of physical drive identifying information 304, 304, . . . , and so on of the data drive which is assigned to the corresponding assigned spare logic drive.

The operating procedure for those pieces of information will be described on the example shown in FIG. 4.

For example, the parity group defining information 306 defining a "data parity group 0" composed of the "drive 00", the "drive 10", the "drive 20" and the "drive 30" is registered in the parity group information 302 thereby to create the "data parity group 0". Likewise, the parity group identifying information 306 of another "data parity group 1" is registered in the parity group information 302 thereby to create the "data parity group 1". Moreover, the pieces of logic drive identifying information 308, 308 and 308 defining the "data logic drive 00", the "data logic drive 01" and the "data logic drive 10" belonging to the "data parity group 0" or the "data parity group 1" are registered in the logic drive information 303 thereby to create the "data logic drive 00", the "data logic drive 01" and the "data logic drive 10".

On the other hand, the parity group identifying information 306 defining the "spare parity group 0" composed of the "drive 02", the "drive 12", the "drive 22"0 and the "drive 32" is registered in the parity group information 302 thereby to create the "spare parity group 0".

After this, in case the data of the "drive 10" belonging to the "data parity group 0" are to be saved, the "assigned spare logic drive 00" having the same net capacity as that of the "drive 10" is retained from the "spare parity group 0" so that its logic drive identifying information 308 is additionally registered in the logic drive information 303 and so that the defining information 305 of the corresponding "virtual drive 00" is additionally registered in the physical drive information 301. The physical drive defining information 305 of that "virtual drive 00" is linked to the defining information 304 of the "data drive 10". As a result, the "virtual drive 00", i.e., the "assigned spare logic drive 00" is assigned to the "data drive 10". Then, the data in the "data disk 0010" are copied to the "virtual drive 00", i.e., the "assigned spare logic drive 00".

After this copying operation, the identifying information of the "data drive 00" is eliminated from the physical disk identifying information recorded in the parity group identifying information 306 of the "data parity group 0", and the identifying information of the "virtual drive 00" is written instead. As a result, in the "data parity group 0", the "data drive 00" is replaced by the "virtual drive 00". Thus, the data of the "data drive 00" are saved in the "assigned spare logic drive 00" in the "spare parity group 0".

Figure 5:
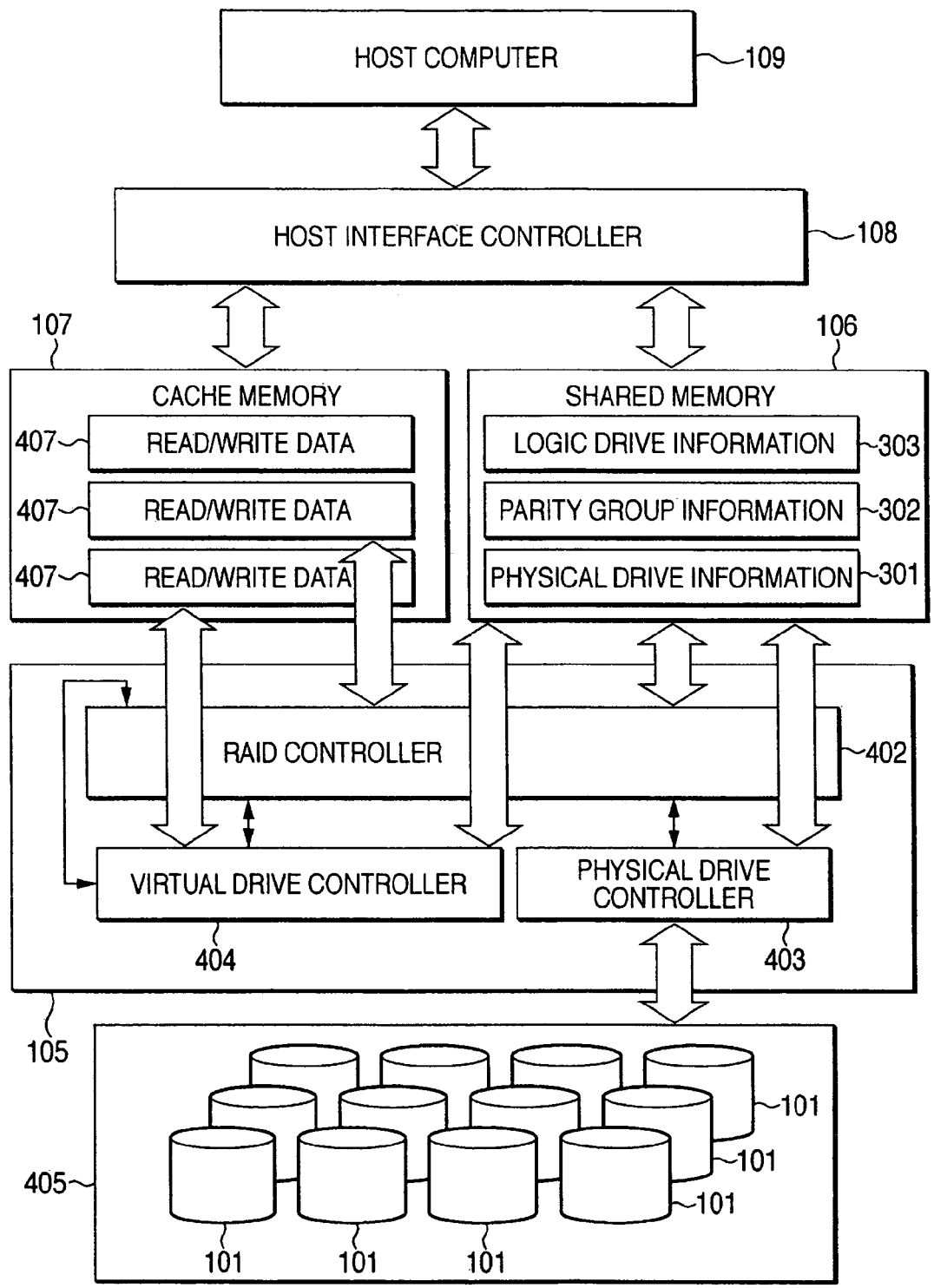
FIG. 5 is a block diagram showing a functional configuration owned by a disk controller 105 for a data read/write processing.

FIG. 5 shows a functional configuration owned by the disk controller 105 for a data read/write processing based on the data read/write demand from the host computer 109 in this embodiment. The data read/write processing to be performed by the disk controller 105 will be described with reference to FIG. 5.

As shown in FIG. 5, the disk controller 105 includes: a RAID controller 402 for processing the data read/write demand; a physical drive controller 403 for controlling the data read/write processing for the physical drives 101, 101, and so on; and a virtual drive controller 404 for controlling the data read/write processing on the virtual drive.

First of all, the description is made on the ordinary data read/write processing, i.e., the data read/write processing of the case in which the parity group demanded for reading/writing the data is composed of only the physical drives (or the data disk drives) but not the virtual drive (or the assigned spare logic drive).

The transfers of the data between the disk controller 105 and the host interface controller 108 are done wholly through read/write data 407 stored in the cache memory 107. The read/write data 407 are stored in the cache memory 107 together with the logic drive identifying information indicating what logic drive the data are for.

At the data writing time, the RAID controller 402 having accepted the data write demand refers to the demanded write data 407 in the cache memory 107, and decides what parity group the logic drive demanded for writing the write data 407 belongs to, with reference to the logic drive information 303 in the shared memory 106. Then, the RAID controller 402 decides what physical drive the parity group is composed of, with reference to the parity group information 302 and the physical drive information 301. After this, the RAID controller 402 issues a write command of the demanded write data 407 through the physical drive controller 403 to the individual physical drives 101, 101, . . . , and so on composing the parity group.

Likewise at the data reading time, the RAID controller 402 having accepted the data read demand decides what parity group the logic drive demanded for the data read belongs to, with reference to the logic drive information 303 in the shared memory 106, and decides what physical drive the parity group is composed of, with reference to the parity group information 302 and the physical drive information 301. After this, the RAID controller 402 issues a read command of the demanded read data through the physical drive controller 403 to the individual physical drives 101, 101, . . . , and so on composing the parity group. Then, the RAID controller 402 composes the data read from the individual physical drives 101, 101, . . . , and so on, and writes the composed data as the write data 407 in the cache memory 107.

The procedure thus far described is the ordinary data read/write one. Here will be described the data reading/writing procedure of the case in which the parity group demanded for reading/writing the data contains the virtual drive (or the assigned spare logic drive).

In case the RAID controller 402 refers the parity group information 302 and the physical drive information 301 in the aforementioned data read/write processing, to find that the parity group demanded for reading/writing the data contains the virtual drive in the spare parity group, the RAID controller 402 issues the data read/write command to the virtual drive. In this case, the RAID controller 402 sends the read/write commands to not the physical drive controller 403 but the virtual drive controller 404. This virtual drive controller 404 refers to the physical drive information 301 and the logic drive information 303 in the shared memory 106, to decide what logic drive (or what assigned spare logic drive) the virtual drive corresponds to.

After this, the virtual drive controller 404 demands the RAID controller 402, in the case of the read command, to read the data demanded from the logic drive (or the assigned spare logic drive). The RAID controller 402 performs a control similar to that of the aforementioned ordinary data reading procedure, thereby to read the data from the logic drive (or the assigned spare logic drive). As a result, the read data 407 are written in the cache memory 107. The read data written in the cache memory 107 by the RAID controller 402 are read by the virtual drive controller 404 and transferred to the RAID controller 402, and are written again in the cache memory 107 by the RAID controller 402. In the case of the write command, on the other hand, the virtual drive controller 404 writes the write data 407 in the cache memory 107 and issues the write demand for the write data 407 to the RAID controller 402. The RAID controller 402 makes a control similar to that of the aforementioned ordinary data write processing, thereby to write the data in the logic drive (or the assigned spare logic drive) The flows of the aforementioned data reading/writing procedures will be described in more detail with reference to FIG. 6 to FIG. 11.

Figure 6:
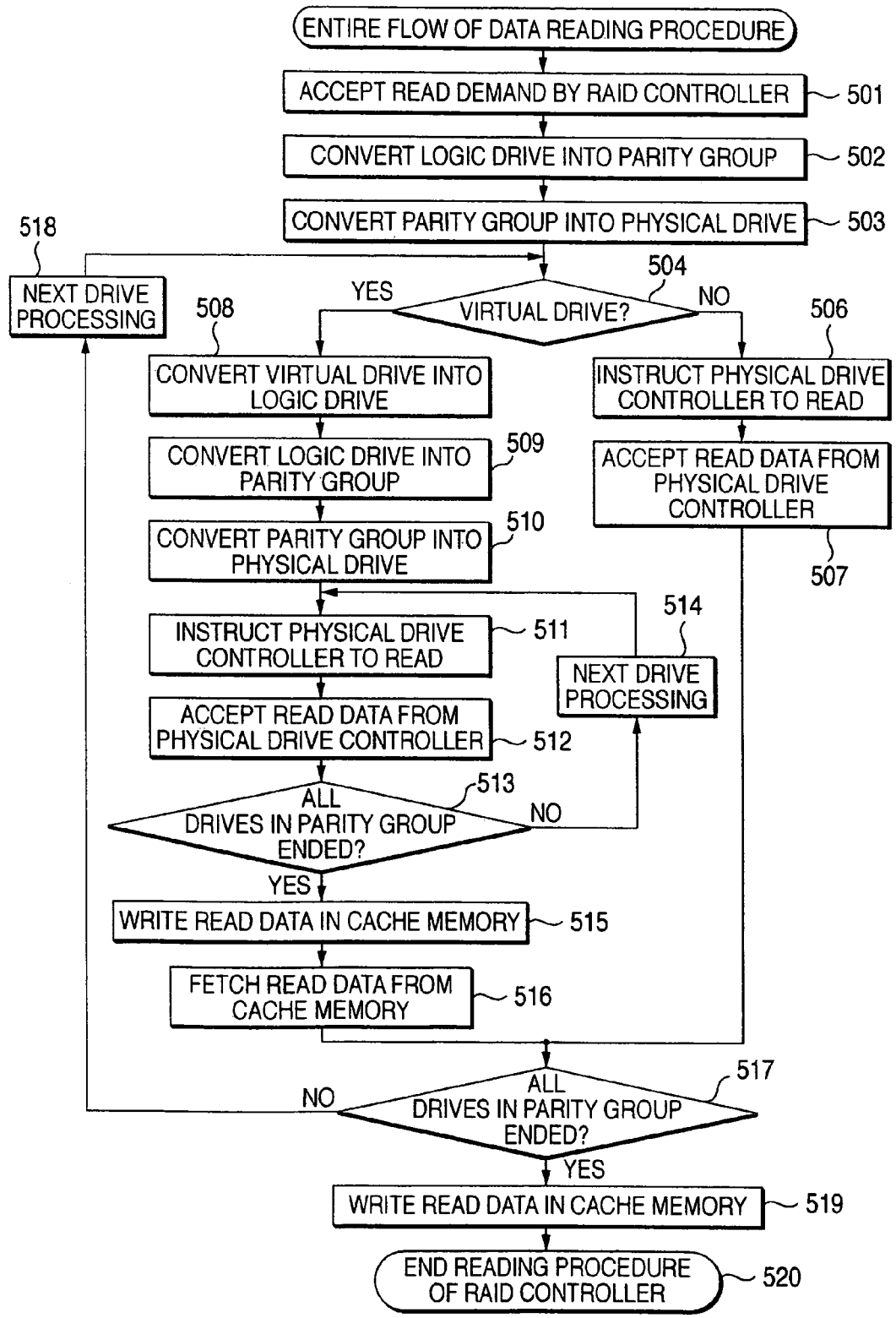
FIG. 6 is a chart showing the entire flow of a data reading procedure.
Figure 7:
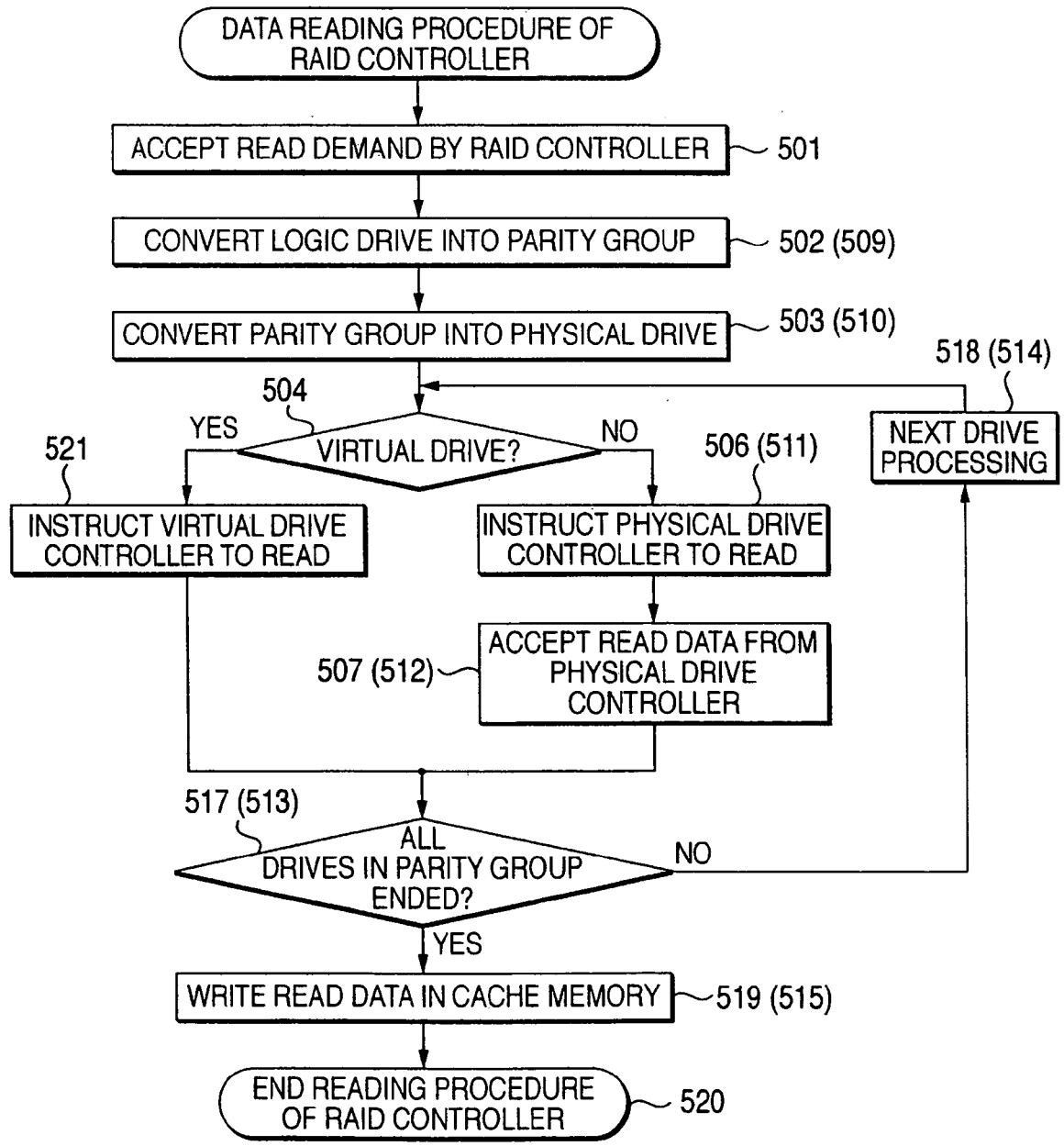
FIG. 7 is a chart showing a flow of the portion of the data reading procedure which is performed by a RAID controller 402.
Figure 8:
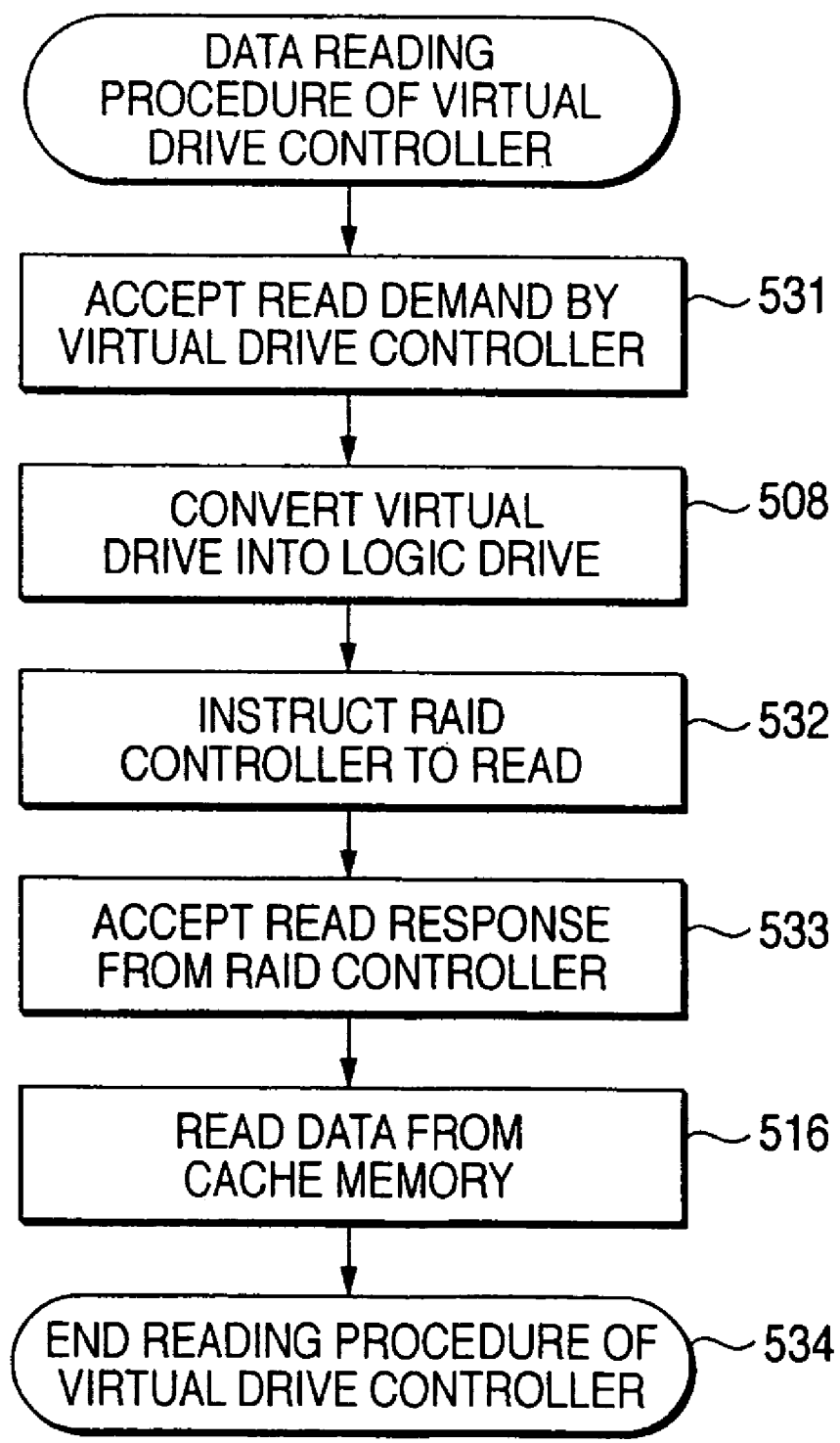
FIG. 8 is a chart showing a flow of the portion of the data reading procedure which is performed by a virtual drive controller 404.

The data reading procedure is described first of all. FIG. 6 shows the entire flow of the data reading procedure. FIG. 7 shows the flow of the portion of the data reading procedure which is performed by the RAID controller 402. FIG. 8 shows the flow of the portion of the data reading procedure which is performed by the virtual drive controller 404.

When the RAID controller 402 accepts (at 501) a data reading demand for a logic drive from the host interface controller 108, as shown in FIG. 6 and FIG. 7, the RAID controller 402 derives (at 502) the parity group to which the logic drive belongs, from the logic drive information 303, and derives (at 503) the data physical drives composing the parity group, from the parity group information 302. The RAID controller 402 decides (at 504) whether those data physical drives are the virtual drives or the ordinary (or actual) data physical drives, on the basis of the kind information of the physical drive information 301.

In case the result of Step 504 is the ordinary physical drives, the RAID controller 402 issues (at 506) the data reading demand to the physical drive controller 403. In case the result of Step 504 is the virtual drives, the RAID controller 402 issues (at 521 of FIG. 7) the data reading demand to the virtual drive controller 404. The RAID controller 402 decides (at 504) the kind of the drive, as described above. For all the drives composing the parity group to be read, moreover, the RAID controller 402 repeats (at 517 and 518) the controls to issue (at 506 or 521) the data reading demand to the physical drive controller 403 or the virtual drive controller 404 in accordance with the kind decided.

In case the RAID controller 402 issued the data reading demand to the physical drive controller 403 at Step 506, the RAID controller 402 then accepts (at 507) the read data from the physical drive controller 403.

In case the RAID controller 402 issued the data reading demand to the virtual drive controller 404 at Step 521, on the other hand, the virtual drive controller 404 having accepted the data reading demand performs the processings as shown in FIG. 6 and FIG. 8. Specifically, when the virtual drive controller 404 accepts (at 531) the data reading demand from the RAID controller 402, the virtual drive controller 404 derives (at 508) what logic drive (or what assigned spare logic drive) the designated virtual drive corresponds to, from the virtual drive identifying information (305) in the physical drive information 301. Moreover, the virtual drive controller 404 issues (at 532) the data reading demand for the logic drive (or the assigned spare logic drive), to the RAID controller 402. Thus, the data reading demand is recursively issued to the RAID controller 402.

When the RAID controller 402 receives the recursive data reading demand from the virtual drive controller 404, the RAID controller 402 performs the controls which are shown by the flow of Steps 501, 509, 510 and 504 in FIG. 7. In this case, moreover, the decision result at Step 504 of FIG. 7 is the ordinary physical drive (or the spare drive). Therefore, the RAID controller 402 advances to Step 511 shown in FIG. 6 and FIG. 7 at which the RAID controller 402 issues the data reading demand to the physical drive controller 403, and accepts the read data from the physical drive controller 403 at Step 512. The RAID controller 402 repeats (at 513 and 514) the aforementioned controls of Steps 511 and 512 for all the physical drives (or the spared rives) composing the parity group (or the spare parity group) to be read. Then, the RAID controller 402 assembles the data read from the individual spare drives, and writes the assembled data as the write data 407 in the cache memory 107.

After this, as shown in FIG. 6 and FIG. 8, the virtual drive controller 404 reads (at 516) the write data 407 written in the cache memory 107 at Step 515, and returns the write data 407 as a response to the data reading demand (at Step 521 of FIG. 7) from the RAID controller 402, to the RAID controller 402. As a result, the RAID controller 402 accepts the read data from the virtual drives.

Thus, the RAID controller 402 acquires all the data that are demanded by the data reading demand from the host interface controller 108, from the ordinary physical drives or virtual drives. Then, the RAID controller 402 assembles the read data acquired, and writes the assembled data as the write data 407 in the cache memory 107.

Figure 9:
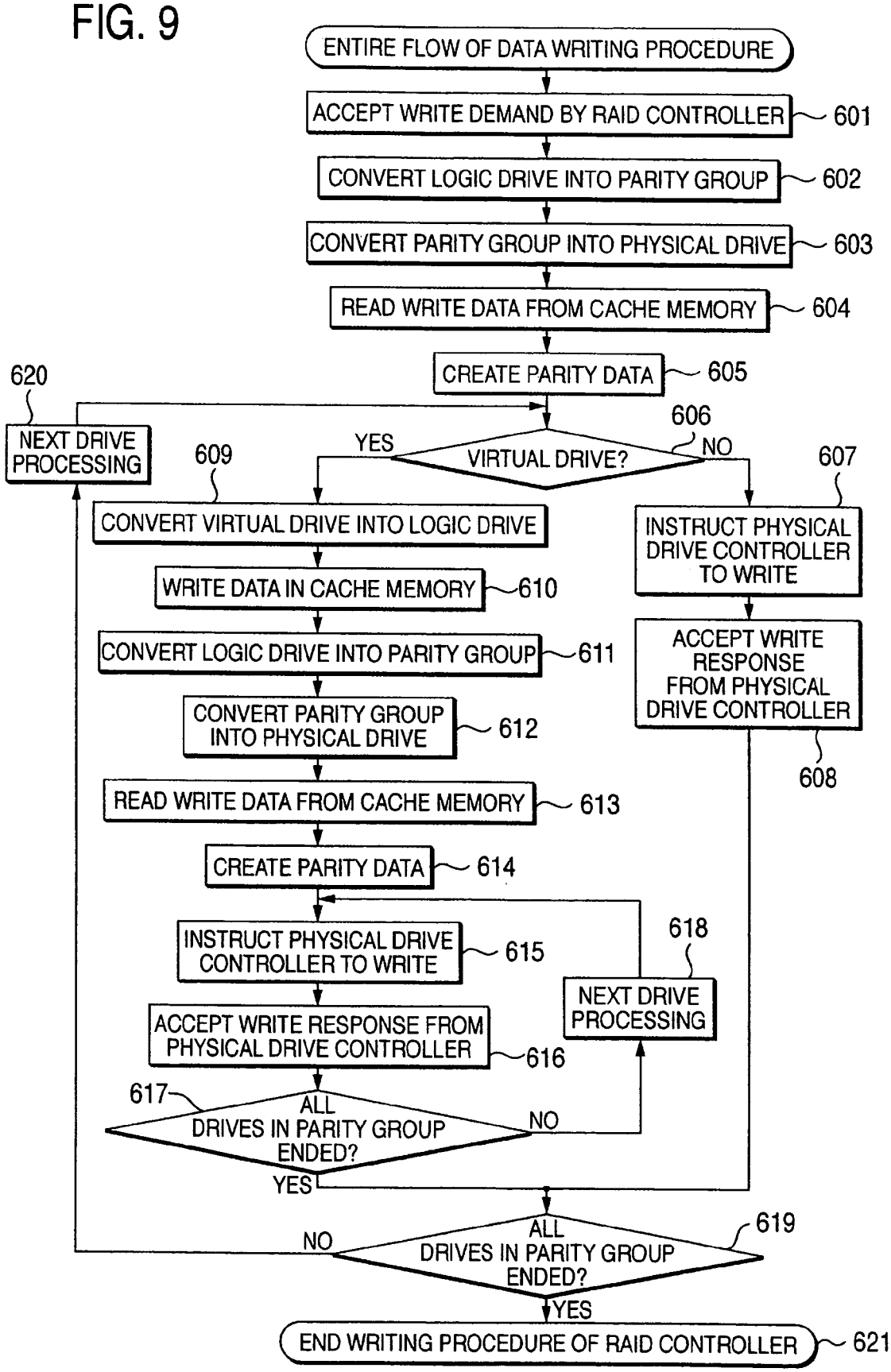
FIG. 9 is a chart showing the entire flow of a data writing procedure.
Figure 10:
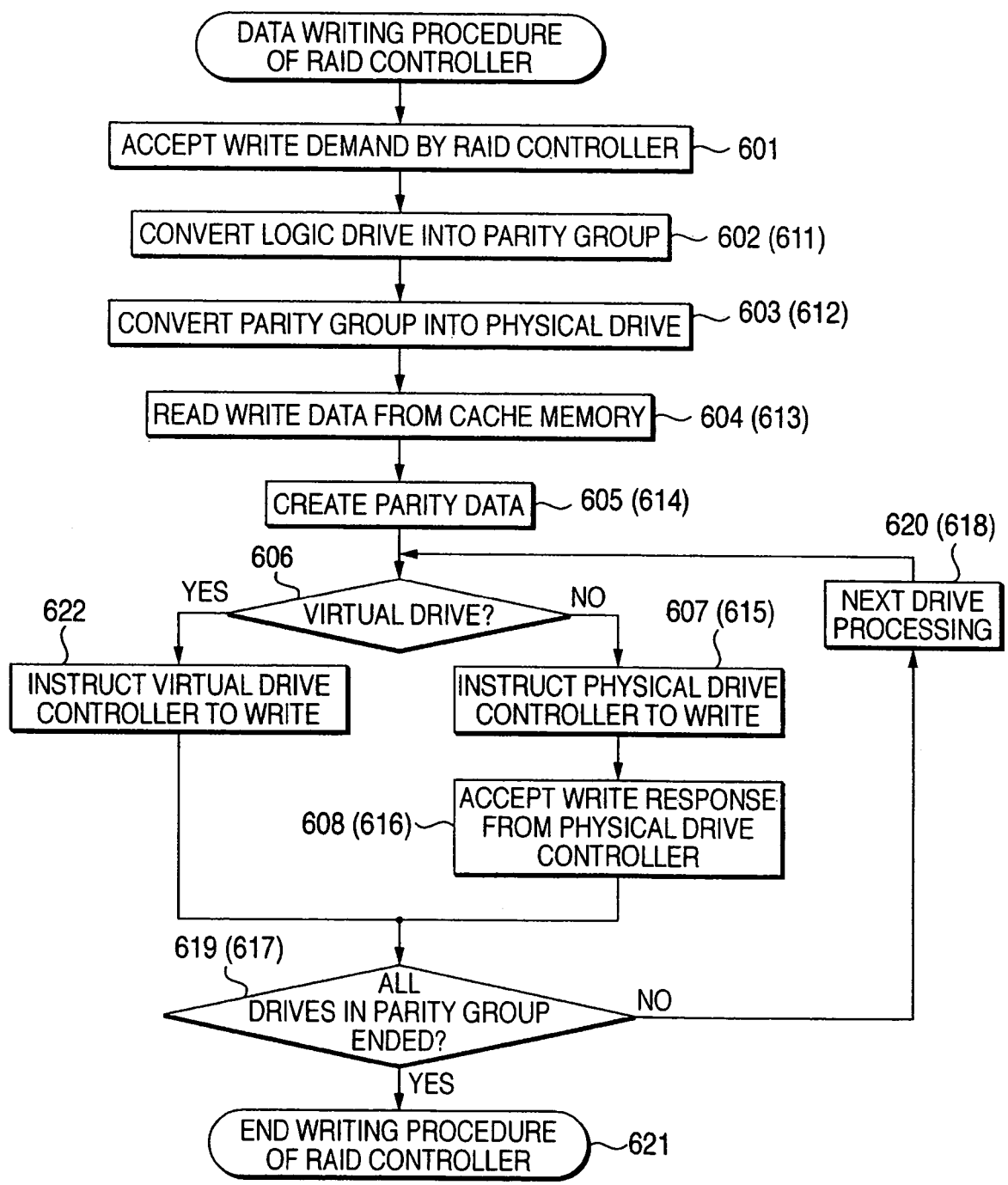
FIG. 10 is a chart showing a flow of the portion of the data writing procedure which is performed by the RAID controller 402.
Figure 11:
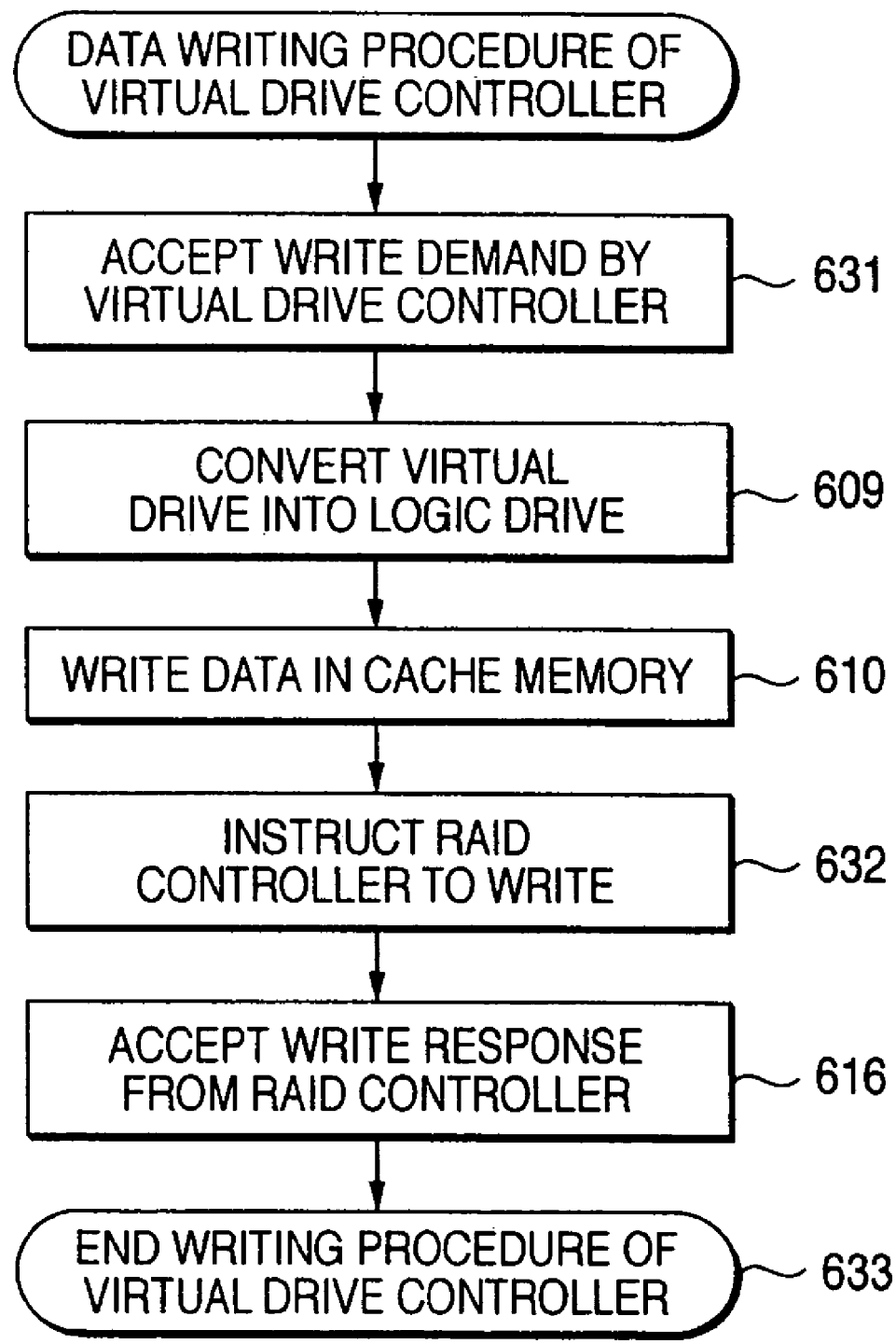
FIG. 11 is a chart showing a flow of the portion of the data writing procedure which is performed by the virtual drive controller 404.

The data writing procedure is described in the following. FIG. 9 shows the entire flow of the data writing procedure. FIG. 10 shows the flow of the portion of the data writing procedure which is performed by the RAID controller 402. FIG. 11 shows the flow of the portion of the data writing procedure which is performed by the virtual drive controller 404.

When the RAID controller 402 accepts (at 601) a data writing demand for a logic drive from the host interface controller 108, as shown in FIG. 9 and FIG. 10, the RAID controller 402 derives (at 602) the parity group to which the logic drive belongs, from the logic drive information 303, and derives (at 603) the data physical drives composing the parity group, from the parity group information 302. Moreover, the RAID controller 402 reads (at 604) the write data from the cache memory 107 and creates (at 605) the parity data on the basis of the write data read.

Moreover, the RAID controller 402 decides (at 606) whether the respective physical drives derived at Step 603 are the virtual drives or the remaining ordinary physical drives, on the basis of the kind information of the physical drive information 301. In case the result of Step 606 is the ordinary physical drives, the RAID controller 402 issues (at 607) the data writing demand to the physical drive controller 403. In case the result of Step 606 is the virtual drives, the RAID controller 402 issues (at 622 of FIG. 10) the data writing demand to the virtual drive controller 404. The RAID controller 402 decides (at 606) the kind of the drive, as described above. For all the drives composing the parity group to be written, moreover, the RAID controller 402 repeats (at 619 and 621) the controls to issue (at 607 or 622) the data writing demand to the physical drive controller 403 or the virtual drive controller 404 in accordance with the kind decided.

In case the RAID controller 402 issued the data writing demand to the physical drive controller 403 at Step 607, the RAID controller 402 then accepts (at 608) the write response from the physical drive controller 403.

In case the RAID controller 402 issued the data writing demand to the virtual drive controller 404 at Step 622, on the other hand, the virtual drive controller 404 having accepted the data reading demand performs the procedures, as shown in FIG. 9 and FIG. 11. Specifically, when the virtual drive controller 404 accepts (at 631 in FIG. 11) the data writing demand from the RAID controller 402, the virtual drive controller 404 derives (at 609) what logic drive (or what assigned spare logic drive) the designated virtual drive corresponds to, from the virtual drive identifying information (305) in the physical drive information 301. Moreover, the virtual drive controller 404 writes (at 610) the write data in the cache memory 107, and issues (at 632) the data writing demand for the logic drive (or the assigned spare logic drive) derived at Step 609, to the RAID controller 402. Thus, the data writing demand is recursively issued to the RAID controller 402.

When the RAID controller 402 receives the recursive data writing demand from the virtual drive controller 404, the RAID controller 402 performs the controls which are shown by the flow of Steps 601, 611 to 614 and 606 in FIG. 10. In this case, moreover, the decision result at Step 606 of FIG. 10 is the ordinary physical drive (or the spare drive). Therefore, the RAID controller 402 advances to Step 615 shown in FIG. 9 and FIG. 10, at which the RAID controller 402 issues the data writing demand to the physical drive controller 403, and accepts the data writing response from the physical drive controller 403 at Step 616. The RAID controller 402 repeats (at 617 and 618) the aforementioned controls of Steps 615 and 616 for all the physical drives (or the spare drives) composing the parity group (or the spare parity group) to be written. As a result, the read/write procedures of the virtual drives are completed.

Thus, all the write data demanded by the data writing demand from the host interface controller 108 are written in the ordinary physical drives or virtual drives composing the logic drive demanded, and the data writing procedure is completed.

Figure 12:
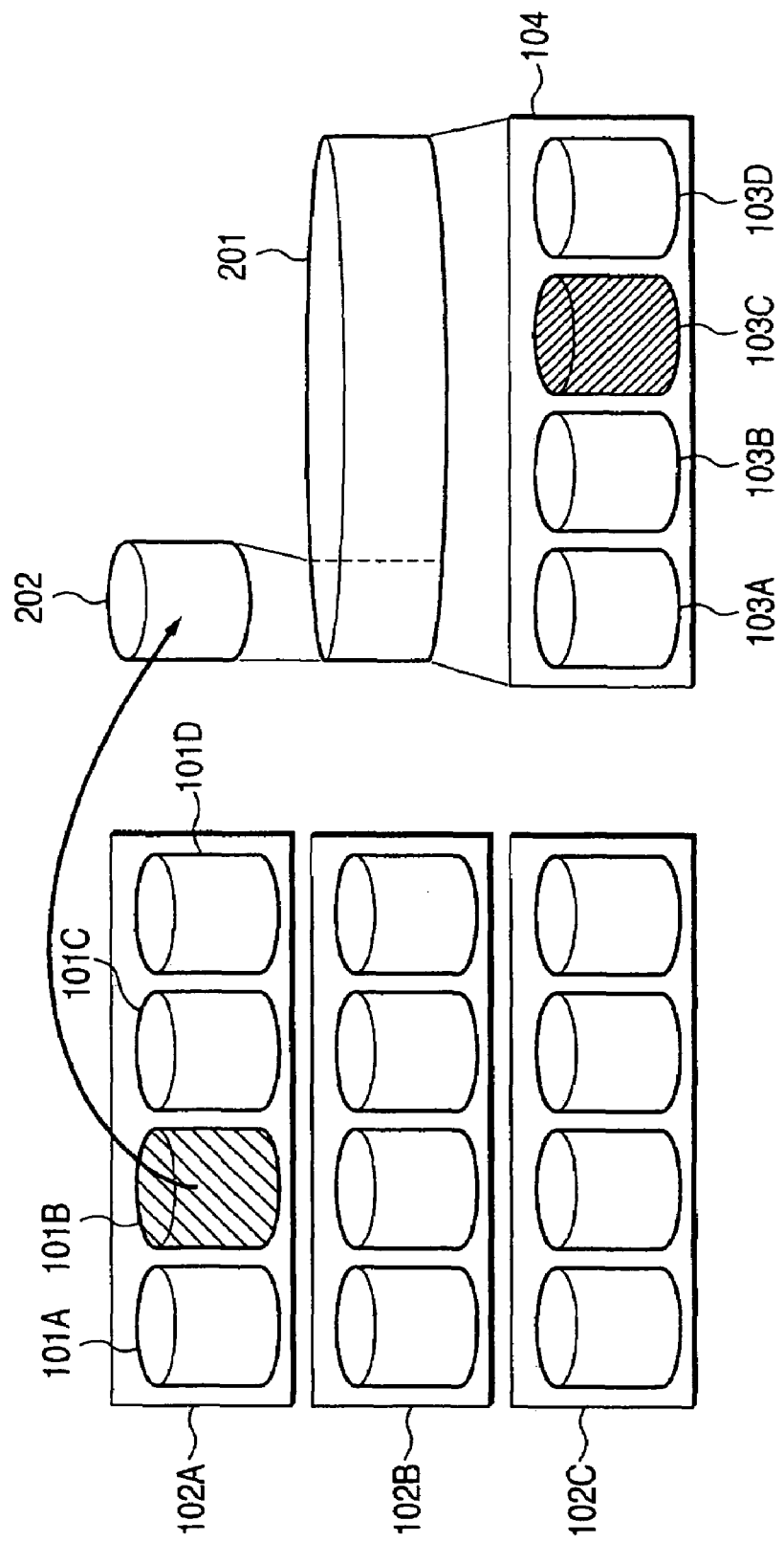
FIG. 12 is a block diagram for explaining an advantage drawn from a configuration in which a spare parity group 104 has a redundancy.

FIG. 12 explains an advantage drawn by making the spare parity group 104 into a parity group having a redundancy of RAID5.

In case the data of a spare drive 103C or a portion of the spare parity group 104 cannot be read, as shown in FIG. 12, the unreadable data can be reproduced from the data of the remaining normal spare drives 103A, 103B and 103D in the spare parity group 104. Therefore, the data of the data drive 101B, which are saved in the spare parity group 104, are not lost in the least. Here in case the spare drive 103C fails, a problem that the access becomes recursive occurs if the data of the spare drive 103C are saved in the spare parity group 104. Therefore, the data of the drive in the spare parity group 104 are not saved.

Figure 13:
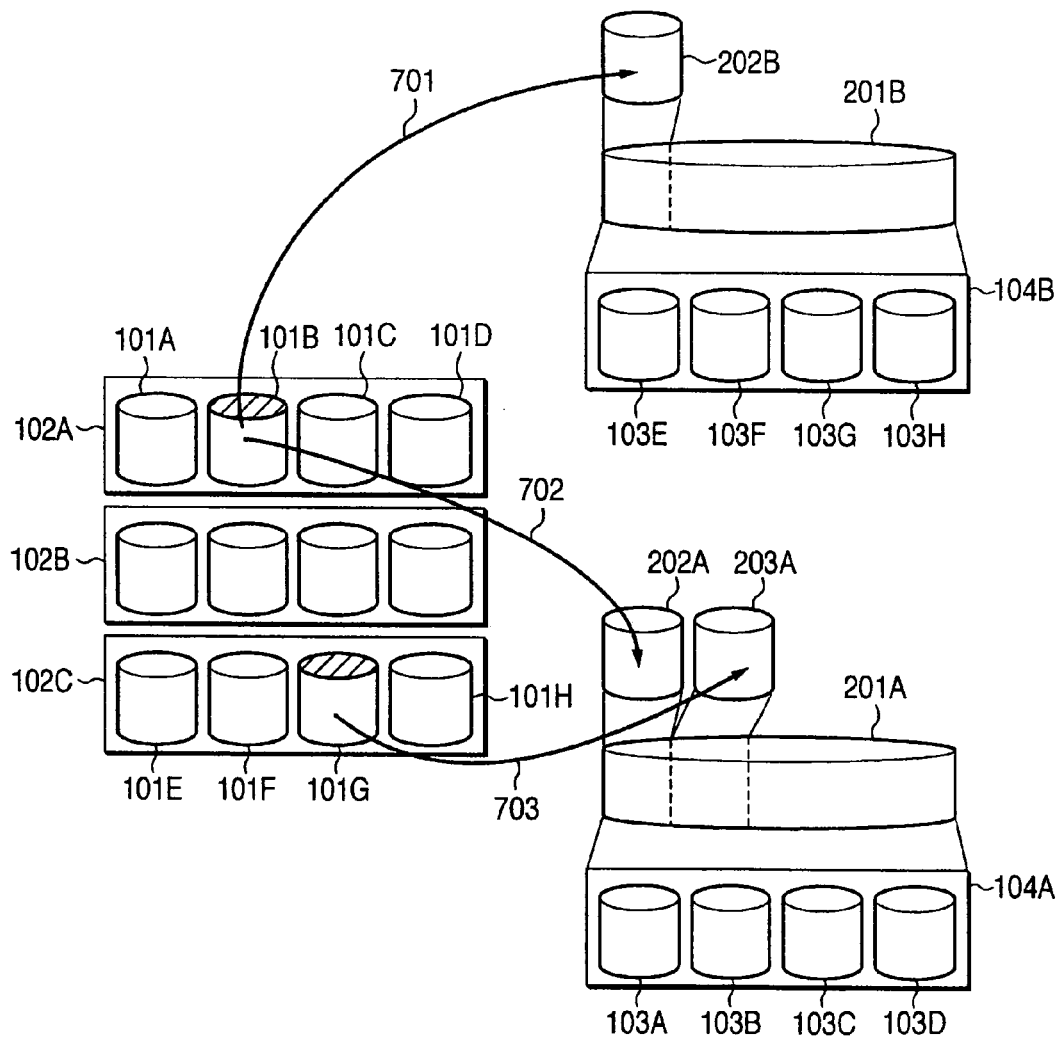
FIG. 13 is a block diagram for explaining a modification of a data saving method using a striping and a mirroring.

As the method for protecting the data against the fault of the spare drives, there can be adopted not only a striping method using the aforementioned redundant spare parity group but also a mirroring method doubling the spare parity group or a method for saving the faulty spare drive in another spare parity group. These methods may be used together; one of them may be selectively adopted; or they may be used separately or combined according to the conditions. In case the data of the highly important data drive 101B are to be saved, as shown in FIG. 13, for example, there may be adopted a safety countermeasure which uses the striping method and the mirroring method together by a double copy on the two redundant spare parity groups 104A and 104B, as indicated by arrows 701 and 702. In case the data of a data drive 101G not having a high importance, on the other hand, there is adopted a safety countermeasure which uses only the striping method by a copy on one redundant spare parity group 104A, as indicated by an arrow 703. Thus, the saving manner may be changed according to the importance.

Although the embodiment of the invention has been described heretofore, it is presented only for an example for explaining the invention but not intended to limit the scope of the invention to the embodiment. The invention could be practiced in other various modes without departing the gist thereof.

In the aforementioned embodiment, for example, the disk controller 105 includes the functions of the RAID controller 402, the physical drive controller 403 and the virtual drive controller 404, but this inclusion is not necessarily indispensable. In a modification, there can be adopted a configuration, in which the host interface controller 108 is provided with the partial functions of the RAID controller 402, the physical drive controller 403 and the virtual drive controller 404, for example, the function of the RAID controller 402 and in which the disk controller 105 and the host interface controller 108 cooperate to control the aforementioned data save. In the case of this modification, the communications between the disk controller 105 and the host interface controller 108 can be performed through the cache memory 107 for the read/write data, for example, and through the shared memory 106 for the control information such as the read/write demand, for example. In another adoptable configuration, a plurality of processors for functioning individually as the disk controller 105 and the host interface controller 108 exist to process the control of the aforementioned data save in a distributed manner. In another adoptable configuration, the disk controller 105 and the host interface controller 108 are realized by a shared processor. In addition, there can be adopted not only the configuration in which separate memory devices to be individually used as the cache memory 107 and the shared memory 106 exist, but also the configuration in which a common memory device is shared as the cache memory 107 and the shared memory 106.

Figure 14:
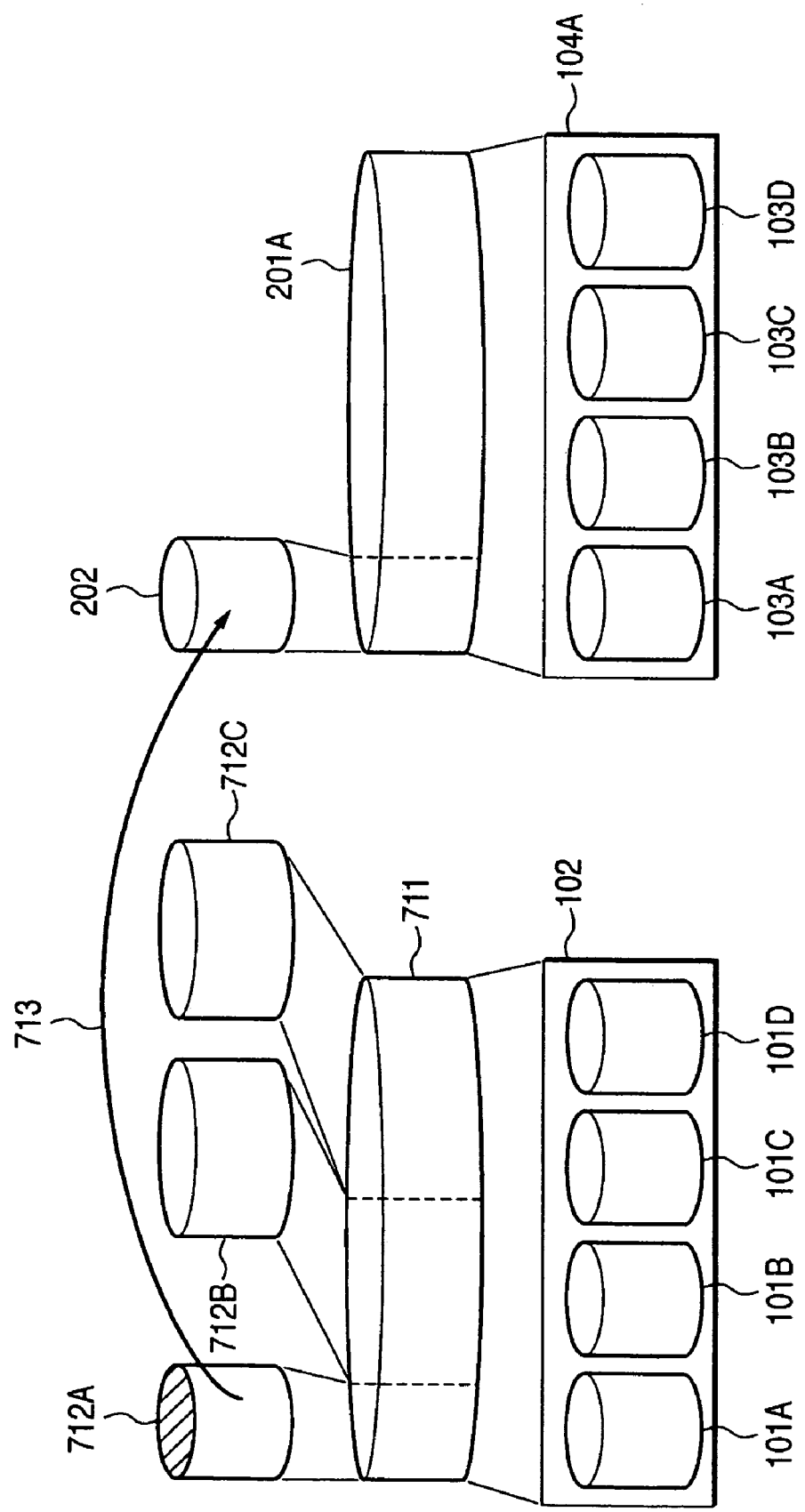
FIG. 14 is a block diagram for explaining an example of a data saving method of a data logic drive.

In the aforementioned embodiment, moreover, the data of the physical drives are saved, but the principle of the invention can be applied to the case in which the data of the logic drives are to be saved. As shown in FIG. 14, for example, the data of the data logic drive 712A selected from a plurality of data logic drives 712A, 712B and 712C in the data parity group 102 can be saved, as indicated by an arrow 713, to the assigned spare logic drive 202 in the spare parity group 104.

There may also be adopted a method for retaining a predetermined one of a plurality of parity groups existing in the disk array system as the spare parity group. In an adoptable configuration, the spare parity group is not retained in advance, but a spare logic drive having a proper capacity is retained in another arbitrary parity group, in case a physical drive or a logic drive needed for the data save occurs in a data parity group, and the data of the physical drive or logic drive needed are saved in the retained spare logic drive.

What is claimed is:

1. A disk array system, comprising:
    data parity groups including logic drives and being composed of data physical drives;
    a spare parity group composed of a plurality of spare physical drives, which are used as saving destinations for said plurality of data physical drives;
    a memory for storing information of said parity groups, said physical disk drives and said logic drives;
    spare logic drive retaining means for retaining a spare logic drive of a desired capacity in said spare parity group, in case a data physical drive to be data-saved exists in said plurality of data physical drives of said data parity group, said spare logic drive being not a spare physical drive of said plurality of spare physical drives, but being a logical area created by using at least one of areas of said plurality of spare physical drives;
    data saving means for saving the data of said data physical drive to be data-saved, in said spare logic drive;
    data parity group reconfiguring means for defining virtual physical drives corresponding to said spare logic drive and for removing said data physical drive to be data-saved from said data parity group and incorporating at least one of said virtual physical drives instead of said data physical drive to be data saved into said data parity group;
    a disk controller that accepts a data reading demand for one of said logic drives from a host and determines one of said parity groups to which the one logic drive belongs from the logic drive information, and determines the plurality of data physical drives composing the one parity group from the parity group information;
    said disk controller determining whether the plurality of data physical drives are virtual drives or data physical drives on the basis of the physical drive information;
    a virtual drive controller that controls access to the virtual drives;
    if the plurality of data physical drives are the actual physical drives, the disk controller issues the data reading demand to the physical drive controller; and
    if the data physical drives are the virtual drives, the disk controller issues the data reading demand to the virtual drive controller.

2. A disk array system according to claim 1, wherein said memory further stores virtual drive information as part of said physical drive information and said virtual drive controller determines which logic drive or assigned spare logic drive the designated virtual drive corresponds to from the virtual drive information.

3. A disk array system, comprising:
    data parity groups including logic drives and being composed of data physical drives;
    a spare parity group composed of a plurality of spare physical drives, which are used as saving destinations for said plurality of data physical drives;
    a shared memory for storing information of said parity groups, said physical disk drives and said logic drives;
    a cache memory for storing the data of a write command;
    spare logic drive retaining means for retaining a spare logic drive of a desired capacity in said spare parity group, in case a data physical drive to be data-saved exists in said plurality of data physical drives of said data parity group, said spare logic drive being not a spare physical drive of said plurality of spare physical drives, but being a logical area created by using at least one of areas of said plurality of spare physical drives;

data saving means for saving the data of said data physical drive to be data-saved, in said spare logic drive;

data parity group reconfiguring means for defining virtual physical drives corresponding to said spare logic drive and for removing said data physical drive to be data-saved from said data parity group and incorporating at least one of said virtual physical drives instead of said data physical drive to be data saved into said data parity group;

a disk controller that accepts the write command for one of said logic drives from a host and determines one of said parity groups to which the one logic drive belongs from the logic drive information, determines the plurality of data physical drives composing the one parity group from the parity group information and reads the write data from the cache memory and creates parity data on the basis of the write data read;

said disk controller determining whether the plurality of data physical drives are virtual drives or data physical drives on the basis of the physical drive information;

a virtual drive controller that controls access to the virtual drives;

if the plurality of data physical drives are the actual physical drives, the disk controller issues the data write command to the physical drive controller; and if the data physical drives are the virtual drives, the disk controller issues the data write command to the virtual drive controller.

4. A disk array system according to claim 3, wherein said memory further stores virtual drive information as part of said physical drive information and said virtual drive controller determines which logic drive or assigned spare logic drive the designated virtual drive corresponds to from the virtual drive information.

5. A disk array system, comprising:

data parity groups including logic drives and being composed of data physical drives;

a spare parity group composed of a plurality of spare physical drives, which are used as saving destinations for said plurality of data physical drives;

a memory for storing information of said parity groups, said physical disk drives and said logic drives;

spare logic drive retaining means for retaining a spare logic drive of a desired capacity in said spare parity group, in case a data physical drive to be data-saved exists in said plurality of data physical drives of said data parity group, said spare logic drive being not a spare physical drive of said plurality of spare physical drives, but being a logical area created by using at least two of said plurality of spare physical drives;

data saving means for saving the data of said data physical drive to be data-saved, in said spare logic drive using at least one of a striping method and a mirroring method; and data parity group reconfiguring means for defining virtual physical drives corresponding to said spare logic drive and for removing said data physical drive to be data-saved from said data parity group and incorporating at least one of said virtual physical drives instead of said data physical drive to be data saved into said data parity group.

6. A disk array system according to claim 5, further including said spare logic drive retaining means determining whether data of a data physical drive to be data-saved to said spare logic drive is to be saved using one or both of said striping method and said mirroring method.

* * * * *